United States Patent [19]

Ormós et al.

[11] 4,237,814
[45] Dec. 9, 1980

[54] APPARATUS FOR THE CONTINUOUS PRODUCTION AND COATING OF GRANULATES IN FLUIDIZED LAYER

[76] Inventors: Zoltán Ormós, 5/d, Cserhat u.; Béla Csukás, 5, Gagarin u.; Károly Pataki, 8, Stromfeld Aurel u.; László Balla, 24/a, Stadion u., all of Veszprém; Tibor Blickle, 4/6, Madach Imre ut., Budapest, all of Hungary

[21] Appl. No.: 24,856

[22] Filed: Mar. 28, 1979

Related U.S. Application Data

[63] Continuation of Ser. No. 835,642, Sep. 22, 1977, abandoned, which is a continuation of Ser. No. 717,287, Aug. 24, 1976, abandoned, which is a continuation-in-part of Ser. No. 581,427, Mar. 27, 1975, abandoned, which is a continuation-in-part of Ser. No. 424,282, Dec. 13, 1973, abandoned.

[30] Foreign Application Priority Data

Dec. 13, 1972 [HU] Hungary .......................... MA 2430

[51] Int. Cl.³ .............................................. B05C 5/00
[52] U.S. Cl. ...................................... 118/24; 118/303; 118/DIG. 5; 425/222
[58] Field of Search .................. 118/DIG. 5, 303, 62, 118/24, 19, 612; 427/3, 213; 366/107, 183; 23/313 FB; 425/222, DIG. 20; 264/117

[56] References Cited

U.S. PATENT DOCUMENTS

| | | | |
|---|---|---|---|
| 2,506,317 | 5/1950 | Rex | 118/DIG. 5 |
| 2,586,818 | 2/1952 | Harms | 118/DIG. 5 |
| 2,995,773 | 8/1961 | Gidlow et al. | 425/222 X |
| 3,112,274 | 11/1963 | Morgenthaler | 118/DIG. 5 |
| 3,198,655 | 8/1965 | Gisiger | 118/303 X |
| 3,213,867 | 10/1965 | McIntyre | 118/313 X |
| 3,227,135 | 1/1966 | Brooks | 118/DIG. 5 |
| 3,241,520 | 3/1966 | Wurster et al. | 118/DIG. 5 |
| 3,306,958 | 2/1967 | Gidlow | 264/117 X |
| 3,351,979 | 11/1967 | Buonaiuto | 118/303 X |
| 3,359,942 | 12/1967 | Prince | 118/303 |
| 3,687,717 | 8/1972 | Philip | 118/303 X |
| 3,714,926 | 2/1973 | Ofner | 118/303 X |
| 3,916,825 | 11/1975 | Schnitzler et al. | 118/303 |

Primary Examiner—John P. McIntosh
Attorney, Agent, or Firm—Young & Thompson

[57] ABSTRACT

Multi-cell fluidization and atomization apparatus for the continuous production and/or coating of granules, for example in pharmaceutical and agricultural chemical industries, comprises a series of upright cylindrical cells through which the particulate material moves sequentially having inlet and outlet openings at various heights and rotary agitators therein. The material is fluidized in the cells and may also be contacted by an atomized liquid.

1 Claim, 15 Drawing Figures

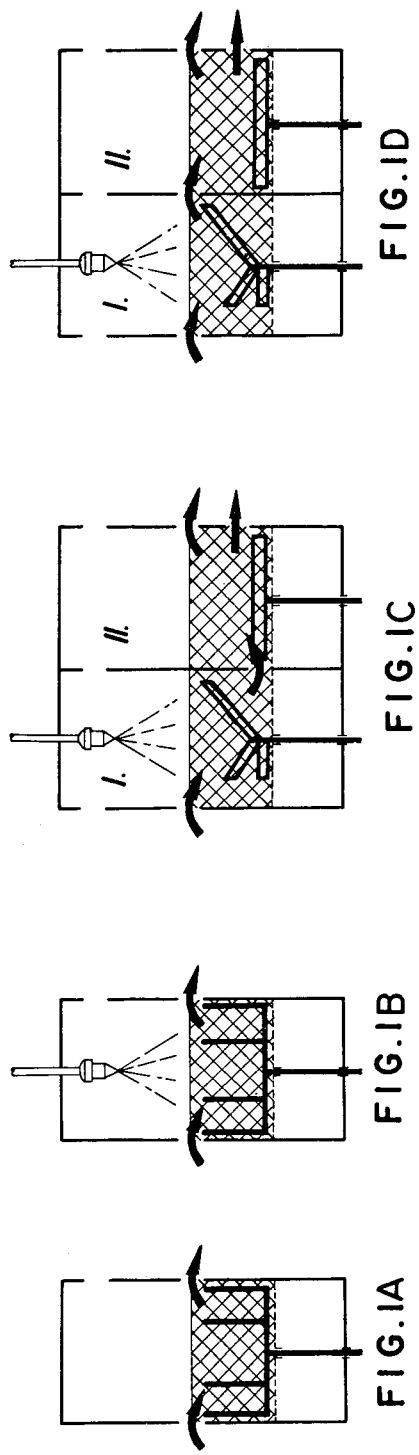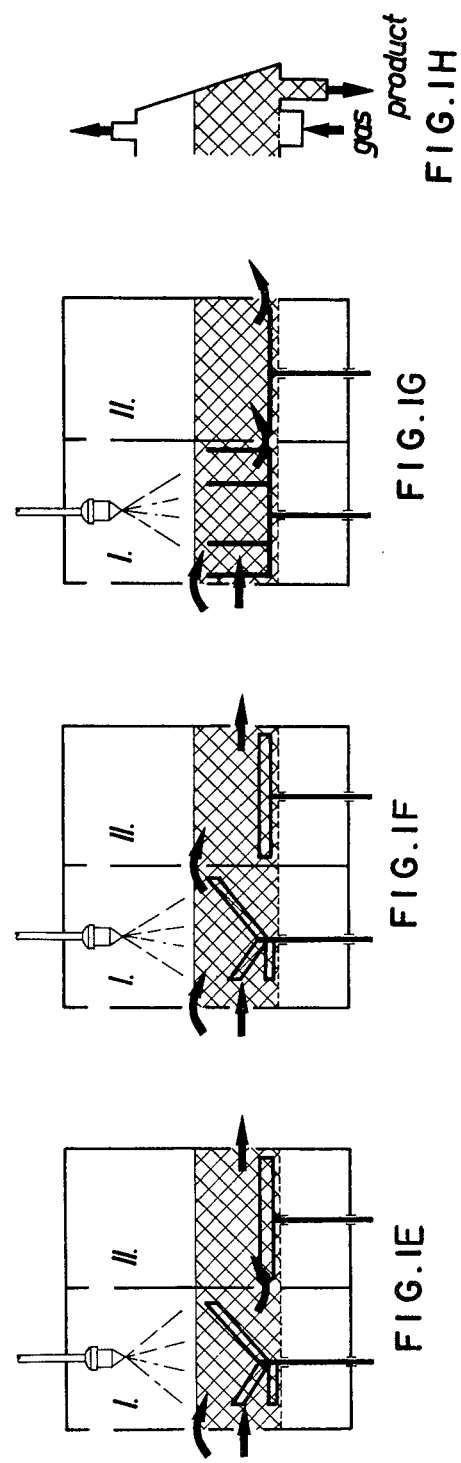

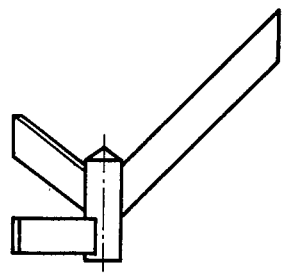
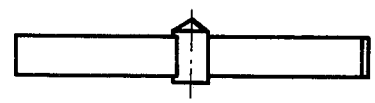
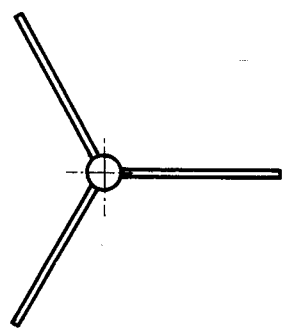
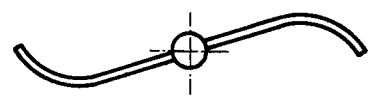
FIG. 2A
FIG. 2C
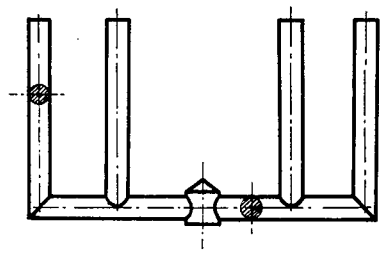
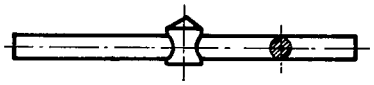
FIG. 2B
FIG. 2D

APPARATUS FOR THE CONTINUOUS PRODUCTION AND COATING OF GRANULATES IN FLUIDIZED LAYER

This application is a continuation of our previously-copending application Ser. No. 835,642, filed Sept. 22, 1977, which in turn was a continuation of our then-copending application Ser. No. 717,287, filed Aug. 24, 1976, which in turn was a continuation-in-part application of our then-copending application Ser. No. 581,427, filed Mar. 27, 1975, which in turn was a continuation-in-part application of our then-copending application Ser. No. 424,282, filed Dec. 13, 1973, all of these earlier applications being now abandoned.

The present invention relates to multi-cell equipment for the continuous production and/or coating of granules by fluidization and atomization.

Granulates are used in various industries partly as a starting material for further operations, e.g. in the pharmaceutical industry for the manufacture of tablets, in the glass industry for melting, etc. and partly as a final product of manufacture e.g. in the cases of fertilizers, detergents, foodstuffs or pharmaceutical preparations in capsules.

In general, granular substances are coated to ensure neutral protecting or special features. The aim of coating can be the reduction of dermal toxicity (industrial protection), reduction and influence of solubility (pharmaceutical preparations, micro-dragees), applying active ingredients onto the surface of the granules (fertilizers), or coloring.

Several methods of preparing a granulation are known. (Rumpf, H: Chem. Ing. Techn. 30, 327, 1958; Browning, J. E.: Chem. Eng. 74, 147, 1967; Filpel, N.: Chem. and Proc. Eng. 50, 67, 1969.) In more recent times a wet granulation process has been widely used in various industries, the essence of which is that a liquid containing binder is added to the moving particle heap as a result of which the particles agglomerate. Depending on the manner in which the movement of the particles is created, one can differentiate between granulating apparatuses operating with mechanical energy and with fluidization.

Among the granulating devices operating with mechanical energy, rotary devices have come into widespread use, such as rotating drums, rotating vats, rotating discs. The disadvantage of the method is that the part of the apparatus containing the whole amount of the material to be granulated (drum, vat, disc) must be continuously rotated and has therefore a high power consumption, and the drying of the granulate is slow, because the drying medium (air) does not stream uniformly through the heap of granules. There is also known a granulating process carried out with the aid of mechanical vibrations.

The essence of granulation by fluidization and atomization is that some binder solution is sprayed into a layer fluidized by warm air, whereby in a single apparatus the mixing of the particles to be granulated, the agglomeration of the particles and the drying of the granules are carried out. The method, which is also suitable for the rapid coating of the particles, has come into use primarily in the pharmaceutical industry (U.S. Pat. No. 3,089,824; Wurster, D. E.: J. Pharm. Sci. 49, 82, 1960).

It was in 1964 that American authors first described their experiments of a granulation process by fluidization and atomization which by now is widely used. (Scott et al: J. Pharm. Sci. 53, 314, 1964; Rankell et al: J. Pharm. Sci. 53, 320, 1964.) In intermittent and continuous operation the granulation is carried out in a single-body fluidization apparatus and the wetting liquid contains binder only. A few years later granulating apparatus by fluidization was developed in Europe also. (Contini, S., Atosoy, K.: Pharm. Ind. 28, 1966, 144; Wolf, G.: Pharm. Ind. 30, 552, 1968; Liske, T., Mobus, W.: Pharm. Ind. 30, 557, 1968.)

A granulating process by vibro-fluidization is known, the essence of which is that through the layer support, together with the gas stream producing the fluidized state vapors are led into the apparatus, whereby a part of the vapor is condensed on the granules and as a result of the partial superficial solution agglomeration and formation of the granules, respectively, takes place (U.S. Pat. No. 2,995,773). A developed variation of said process is represented by the solution in which the solid material is delivered by the layer support, shaped as a belt conveyor, from cell to cell, in the agglomerating zone (U.S. Pat. No. 3,306,958). The field of application of the process mentioned above is considerably more restricted than that of granulation by fluidization and atomization, since agglomeration by using solvent vapors can be employed only for materials which are soluble and adhesive under the influence of wetting with the given solvents; in contrast therewith, by using solutions of atomized binders, even granules which are otherwise insoluble in the liquid in question and moistenable with difficulty, can be granulated easily. A further disadvantage of the agglomeration process realized by vapors lies in that solid components of small quantities can neither be dispersed in a convenient way nor used for coating the granules.

When granulation takes place by fluidization and atomization, in an intermittent process, the mixing of the particles to be granulated, wetting, the agglomeration of the particles and drying of the granules are all carried out in one single apparatus or space. The four operations enumerated can be separated in time—partly or entirely—in the course of the intermittent process.

In a conventional single-stage process by fluidization and atomization continuous operation can be realized but granulating conditions, such as provided in batchwise operation, cannot be guaranteed. In continuous operation the average moisture content of the fluidized layer must not exceed the value specified for the final product, which is most frequently between 0–2% by weight. The necessarily prescribed low moisture content of the fluidized layer is to be considered as disadvantageous from the point of view of formation of granulates. It is highly important in granulation by fluidization and atomization that the degree of wetting of the particles to be granulated should be at an optimum. A very low moisture content, mostly between 0–2% by weight, is very disadvantageous from the point of view of agglomeration, because, on the one hand, the rate of granule formation is very low and, on the other hand, the physical properties of the granules formed in the "dry" fluidized layer are not favorable. The granules formed in the "dry" fluidized layer are highly porous, their compactness is smaller and their flow properties are poorer than a material mixture to be granulated with an optimal moisture content—most frequently 5–15% by weight—and agglomerated and subsequently dried.

A further drawback of the continuous, single-stage granulation process by fluidization and atomization is that it can be used either for granulation or coating only, it is impossible to carry out a cycle of operation (e.g. drying—granulation—coating) in one single apparatus. Realization of the single operations in separate apparatuses involves—due to the high space and labor requirement—high costs and from the point of view of labor safety transfer of the material between the different devices becomes also a problem.

The aim of the invention is to develop multi-cell equipment for performing fluidization, built up of special equipment units of different functions, by the aid of which a granulate and/or a coated granulate can be produced in continuous operation, in one single fluidization apparatus from one or more, dry or wet starting material(s) to be granulated and coated, respectively, under optimal circumstances, with the possibility of controlling size distribution of the granulates as well as other physical features.

The invention is based on the recognition that granulation and coating of particles by fluidization and atomization can be carried out under optimal conditions by a fluidization apparatus provided with functionally differentiated mechanical mixing elements of different types and variable numbers of revolution, the apparatus consisting of cylindrical cells separated by partition walls from each other with openings placed at different heights, being permeable to the flow of particles, which can be assembled in case of necessity of special apparatus units, serving for part-operations or partial operational cycles; the function of said apparatus-units are as follows:

(a) pre-heating, drying (activation) and mixing of the materials to be granulated and/or to be coated;
(b) dispersion of one of the components (active ingredient) by atomization in the form of a solution, melt or suspension;
(c) wetting of the particle mixtures to be granulated with a dispersed (atomized) liquid (solution, suspension or melt) containing a binder; drying and cooling, respectively, of the agglomerated particles (granulates);
(d) wetting of the particles to be coated with a dispersed (atomized) liquid (solution, suspension or melt) containing the coating material, as well as drying and cooling the granules already coated;
(e) wetting of the partly granulated (pre-granulated) or coated particles with a dispersed (atomized) fluid (solution, suspension or melt) containing a binder, as well as drying and cooling, respectively, of the agglomerates (granulates);
(f) wetting of the granulated or coated particles with a dispersed (atomized) liquid (solution, suspension or melt), containing the coating material, as well as drying and cooling, respectively, of the coated granulates (particles);
(g) wetting of the granulated or coated particles with a dispersed (atomized) liquid (solution, suspension or melt), containing any component (active ingredient), as well as drying of the granulates;
(h) removal of the powder content (small sized particles) from the granulated and/or coated heap of granules in a gas stream.

In the accompanying drawings:

FIGS. 1A-1H are schematic side elevational views of the individual cell units from which the multi-cell apparatus according to the present invention is assembled;

FIG. 2A shows side elevational and top plan views of a first embodiment of stirrer for use in the cells;

FIG. 2B shows an elevational view of a second embodiment of stirrer;

FIG. 2C shows views similar to FIG. 2A, but of a third embodiment of stirrer;

FIG. 2D is a view similar to FIG. 2B, but of a fourth embodiment of stirrer;

Figure 3:
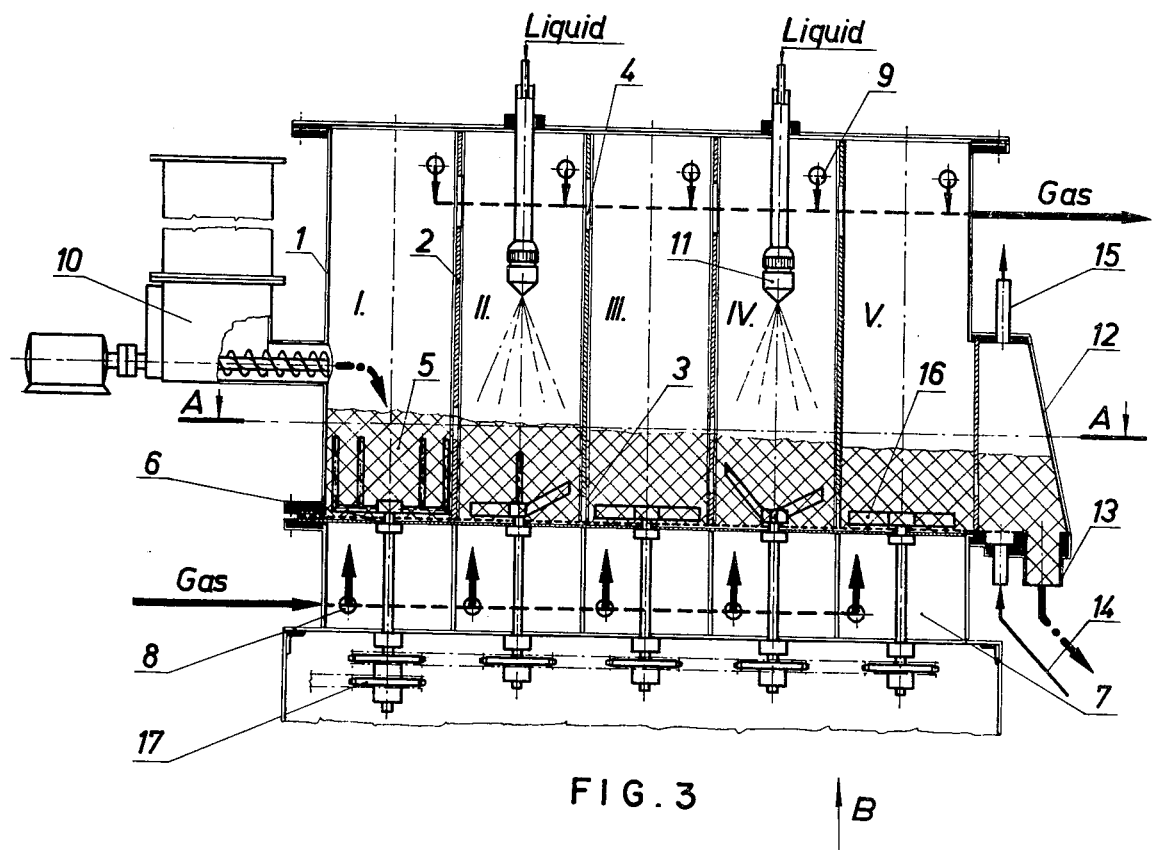
FIG. 3 is a side elevational view of the entire apparatus according to the present invention.
Figure 3A:
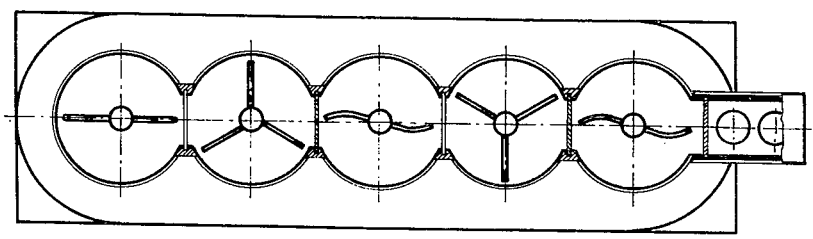
FIG. 3A is a cross-sectional view on the line A—A of FIG. 3.
Figure 3B:
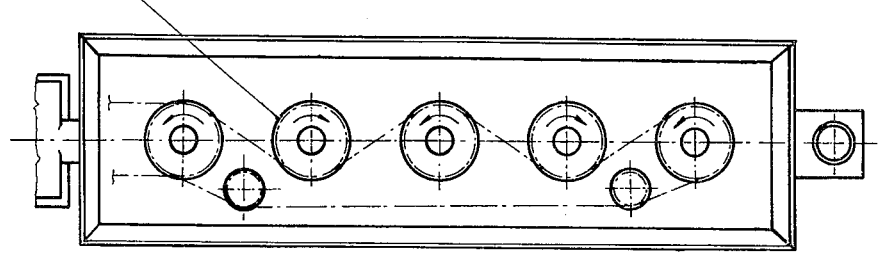
FIG. 3B is a bottom plan view of FIG. 3, in the direction of the arrow B in FIG. 3.

FIG. 1a illustrates the cell-unit serving for preheating, drying (activation) and mixing of the particles to be granulated and/or coated, characterized in that both on the inlet side of the particle heap and on the partition wall separating the neighboring cells the opening is formed at the upper part of the layer and the unit is provided with a mechanical mixing element of the horseshoe mixer type (anchor agitator) (FIG. 2b). By the position of the openings permitting the flow of the particles, re-mixing of the particles already agglomerated or coated from the next cell can be maintained at a minimum. The mechanical mixing element of the horseshoe mixer type (FIG. 2b) used here exerts its influence over the entire height of the fluidized layer, its disintegrating effect is rather low but when using materials with disadvantageous fluidizing features and a certain moisture content (liable to adhesion) fluidization anomalies (e.g. formation of channels) can be avoided.

The unit illustrated in FIG. 1b—similarly to the unit described before—is provided both on the inlet side and outlet side with a transfer opening formed in the upper part of the layer; in the unit there is a mixing element of the horseshoe mixer type (FIG. 2b). The unit serves for the distribution of one of the components, mostly an active ingredient, constituting the granulate, in the form of a dispersed (atomized) liquid. Dispersion of the liquid takes place preferably by the aid of a pneumatic atomizer.

The unit, consisting of two cells, illustrated in FIG. 1c,—serving for wetting the particles to be granulated with a dispersed liquid containing a binder, and drying the agglomerates (granulates) or cooling in the case of melts—can be characterized in that in the partition wall the openings permitting the flow of the particle heap are formed on the inlet side of the cell I, at the upper part of the layer, between cell I and II at the lower part of the layer and on the outlet side of the cell II in the middle and at the upper part of the layer, whereas in cell I in addition to the pneumatic atomizer there is an asymmetrical three-bladed agitator arranged (FIG. 2a) and in the cell II there is a mechanical mixing element in the form of a bent blade (FIG. 2c). The position of the openings ensures a minimal re-mixing from the cell I to the previous cell, simultaneously enabling proper admixing or communication between the cells I and II and an unhindered advancing movement of the small-sized, quick-drying agglomerates, while progress of the oversized undisintegrated agglomerates does not take place. The asymmetrical three-blade mixer (FIG. 2a) in the cell I exerts its influence along the entire height of the thick layer in a fluidized state; the three blades positioned at an angle of 120° stir three different zones of the layer; due to the asymmetrical shape, the vortex cone forming effect of the centrifugal force will be equalized, consequently the mixer does not exert any negative influence on the fluidization movement, not even in case of bigger particles. Said type of mixer advantageously prevents overgranulating. The bent blade mixer (FIG. 2c) mounted in cell II exerts a considerable disintegrating effect on the bottom of the layer; but its use deviation of particle size distribution can be significantly reduced, simultaneously avoiding formation of oversized agglomerates. The particles are forced to a centripetal movement by the bent blade, whereby equalization of the compacting effect along the centrifugal field takes place.

The embodiment of the two-cell unit illustrated in FIG. 1d—with the exception of the position of the opening between cells I and II—corresponds to that illustrated in the previous FIG. 1c. In this unit, serving for wetting the particles to be coated with a dispersed (atomized) liquid containing material, as well as for drying the particles coated and for cooling when using a melt, the openings permitting the flow of particles are formed between the cell I and II at the upper part of the layer. By the position of the opening it can be ensured that on the one hand the material to be coated will not by-pass the atomizing zone, on the other hand the disintegration of the particles agglomerated will occur too, since only the smaller particles are found in the upper part of the layer, while a significant quantity of the bigger particles agglomerated remains within the sphere of action of the mixing element.

The function of the apparatus unit illustrated in FIG. 1e is to wet the particles partly granulated (pregranulated) in the unit of the type 1c or coated in the unit of the type 1d, with a dispersed (atomized) liquid containing a binder, as well as to dry and to coat, respectively, the granulates. In this unit, in the partition wall separating the individual spaces, the openings permitting the flow of the particle heap are formed on the inlet side of the cell I, in the middle and on the upper part of the layer, on the outlet side of the cell II, in the middle of the layer, whereas other characteristics comply with the characteristic features of the granulating unit illustrated in FIG. 1c.

The embodiment of the apparatus unit illustrated in FIG. 1f,—serving for wetting the particles granulated in the unit 1c or coated in the unit 1d with a dispersed liquid containing the coating material, as well as for drying the granulates and particles coated, respectively, and when atomizing a melt, for the cooling of the same—corresponds to the coating unit shown in FIG. 1d with the difference that the openings permitting the flow of particles are formed on the inlet side of the cell I, in the middle and upper part of the layer and on the outlet side of the cell II, in the middle of the layer.

The function of the apparatus-unit illustrated in FIG. 1g is to distribute any of the components, mostly an active ingredient, in the form of a liquid (suspension or solution) by atomization on the surface of the particles either granulated in the unit 1c or coated in the unit 1d, as well as for the substantial drying of the same. The apparatus unit can be characterized in that in respect of the position of the openings permitting the flow of the particle heap, the unit corresponds to the arrangement of the post-granulating unit 1c, whereas in the cell I preferably a pneumatic liquid atomizer and a mechanical mixing element of the horseshoe mixer type (FIG. 2b) has been arranged, in the cell II, a mechanical mixing element of the rod type is to be found. The mixing elements, both the rod type and horseshoe type mixers, exert an essentially lower disintegrating effect, than the three-blade or bent blade mixing elements, consequently disintegration of the granulates does not occur.

In FIG. 1h a unit has been illustrated serving for the removal of the powder content (small sized particles) from the particle heap granulated and/or coated, by using a gas stream.

The dispensing unit of FIG. 1h can be attached to any of the units 1a–1g but it should always form the very last unit of the apparatus; its employment is expedient but not imperative. (When speaking about the number of cells within the apparatus, we always mean the total of the cells serving for the realization of one single part-operation, without the dispensing unit of FIG. 1h.)

The number and type of the single units to be incorporated into a multi-cell fluidization apparatus suitable for performing the technological task given, is always determined by the momemtary number of the operational stages to be realized. In view of practical requirements, however, it can be stated that in most cases the employment of a six-cell unit suffices, whereas said type of apparatus may be formed of five units selected from the eight different types illustrated in FIG. 1 (e.g. preheating/mixing—dispersion of the active ingredient—granulation (drying)—coating (drying)—removal of the powder content: 1a-1b-1c-1f-1h).

In the individual units, by the variation of the height of the openings permitting the flow of the particle heap and by varying the relative size of said openings in relation to the dimensions of the equipment, as well as by varying the type and number of revolutions of the mechanical mixing elements, control of the particle distribution of the granulate and the granules coated, respectively, can be achieved, simultaneously control of other physical features (porosity, abrasive resistance, etc.) becomes possible. In view of the function of the single units the relative height of the openings in relation to the minimal layer thickness (at the bottom, in the middle or on the top of the layer), as well as the type of the mechanical mixing elements can be easily determined cf. FIG. 1, whereas the dimension of the openings, the size and number of revolutions of the mechanical mixing elements can be determined in view of the dimensions of the apparatus (e.g. the size of the single cells) and physical properties of the starting materials and products.

It is well-known that both in the chemical industry and related industrial sectors (e.g. the food industry) the necessity to granulate and agglomerate small-sized particles often arises. When using the apparatus according to our invention it seems to be expedient—insofar as coating of the granulate or applying an atomized liquid containing an active ingredient onto the finished granulate is not imperative—to granulate in two stages. In this case the multicell fluidization apparatus can be assembled from the units illustrated in FIGS. 1a-1c-1e-1h, in that order.

A five-cell fluidization apparatus for continuous granulation is diagrammatically illustrated in FIG. 3. The body 1 illustrated in FIG. 3 consists of five adjacent cylindrical cells and one dispensing cell with square cross-section. The granular material is flowing from cell to cell through opening 3 formed in the partition walls 2 between the cells in accordance with the type-units 1a–1c. The openings 4 in the partition walls, in the upper part of the apparatus, ensure equal pressure in the air space of the cells. The fluidized layer 5 is above the gas distributing plate 6. The gas inlet space beneath the plate 6 has been divided into cells, thus through the gas inlets 8 gas in different quantities and at different temperatures can be fed into the individual cells. The gas leaving the fluidized layer passes through the gas outlets 9 into the precipitator. Charging of the solid material into the cell I takes place by means of the screw feeder 10. The liquid(s) (suspension, solution or melt) containing the binder is (are) atomized by the aid of atomizers 11 into the fluidized layer. The granulated product is discharged through the dispensing fluidization cell 12 and through a vibratory or cellular feeder (not shown) connected to the outlet 13. The particles under the size limit desired are blown out by an air stream led into the dispensing cell through the inlet 14, the particles being led back through the outlet 15 into the cell II. The mechanical mixing elements 16 mounted in the individual cells are driven through the transmission 17 by an electric motor (not shown).

The invention will be described by aid of some examples not having any restricting character.

EXAMPLE 1

In the fluidization apparatus for continuous production of granulates, consisting of the elements according to FIGS. 1a-1c-1h, (wherein the individual cells have a cross-section of 0.315 m² and therefore a total useful cross-section of 0.945 m²) pharmaceutical tablet granules are produced with the following composition:

| | | |
|---|---|---|
| active ingredient "A" | 10% | |
| active ingredient "B" | 10% | |
| active ingredient "C" | 1% | |
| lactose | 48% | |
| starch | 28% | |
| ethyl cellulose | 3% | |
| | 100% | | where
active ingredient "A"=amidazophenum (1-phenyl-2,3-dimethyl-4-dimethyl-aminopyrazolin-5-one)
active ingredient "B"—phenaceticum (p-ethoxyacetanilide)
active ingredient "C"=coffeinum (1,3,7-trimethylxanthine).
Mixer types:
cell I: horsehoe mixer (anchor agitator) (FIG. 2b)
cell II: three-blade rotor (FIG. 2a)
cell III: bent blade (FIG. 2c)
Position of the openings:
between cells I and II: at a height of 0.12 m (i.e. in the upper part of the layer), width: 0.06 m, height: 0.04 m
between cells II and III: at the bottom of the layer, width: 0.06 m, height: 0.03 m;
between the cell III and the dispensing cell: at a height of 0.12 m (i.e. in the upper part of the layer), width: 0.06 m, height: 0.04 m, as well as at a height of 0.04 m (i.e. in the middle part of the layer), width: 0.06 m, height: 0.03 m.

The active ingredient "C" being present in a small quantity (1%) is slightly soluble in water but readily dissolves in chloroform, hence as a binder we select ethyl cellulose which also readily dissolves in chloroform, because in this way the small quantity component can be introduced into the granulate with the granulating liquid, whereby the uniformity of the composition is ensured.

Into cell I of the three-cell fluidization granulation apparatus we introduce 0.5 kg/h ingredient "A" and 0.5 kg/h ingredient "B", as well as 2.4 kg/h lactose and 1.4 kg/h starch. The function of the first cell is to mix the basic pharmaceutical materials to be granulated and to pre-heat the mixture. Into this cell we introduce via a perforated plate 20 m³/h air at 40° C. as the fluidizing gas, which results in an expansion of the mixture layer by a factor of about 1.6–1.7. The air passing out of the first cell has a temperature of 30° C.

In cell II occurs the wetting of the basic materials to be granulated with a solution containing a binder, the agglomeration and the partial drying of the formed granules, as well as the introduction into the layer of the small-quantity ingredient "C". Into the layer, which is fluidized by air in the quantity of 40 m³/h at 40° C., we introduce by atomization 5 l/h chloroform as granulating liquid which also contains 30 g/l ethyl cellulose and 10 g/l ingredient "C". The temperature of the air passing out of cell II is 15° C.

Cell III of the apparatus serves for the drying or after-drying of the formed pile of granules. In this chamber the appropriate expansion of the fluidized layer is caused by 28 m³/h air at 40° C. which leaves the layer at 25° C. From cell III there is removed 5 kg/h tablet granulate of the above described condition which has the following particle size distribution:

| | |
|---|---|
| under 0.2 mm | 15% |
| 0.2–0.4 mm | 17% |
| 0.4–0.6 mm | 23% |
| 0.6–1.0 mm | 31% |
| 1.0–2.0 mm | 14% |
| above 2.0 mm | — |
| | 100% |

The powder content separated from the air discharged from the apparatus (cells I, II and III) and the dispensing cell is continuously fed back to cell I.

EXAMPLE 2

In the continuously operating five-cell fluidization-granulation apparatus composed of the units 1a-1a-1b-1c-1h, wherein the cross-section of the individual cells is 0.0135 m² and the total useful cross-section of the apparatus is 0.1575 m², pharmaceutical tablet granulate is produced of the following composition:

| | |
|---|---|
| active ingredient "A" | 50% |
| active ingredient "B" | 10.0% |
| active ingredient "C" | 0.5% |
| lactose | 24.5% |
| starch | 12.0% |
| ethyl cellulose | 1.5% |
| gelatin | 1.5% |
| | 100.0% | where:
active ingredient "A": amidazophenum (1-phenyl-2,3-dimethyl-4-dimethylaminopyrazolin-5-one)
active ingredient "B": acidum ascorbicum (L-ascorbic acid) active ingredient "C": coffeinum (1,3,7-trimethylxanthine).

The small-quantity (0.5%) active ingredient "C" is slightly soluble in water but dissolves readily in chloroform; in addition to the ethyl cellulose binder which also dissolves well in chloroform, gelatin is also used as binder in the granulation, because in our experience in this way superior quality (more wear-resistant) tablets may be produced than without gelatin.

The granulation problem is more complicated than in the previous example by the additional fact that ingredient "A" is available in a wet condition, with a water content of 30% by weight.

Mixer types:
cell I: horseshoe-type mixer (FIG. 2b)
cell II: horseshoe-type mixer (FIG. 2b)
cell III: horseshoe-type mixer (FIG. 2b)
cell IV: three-blade mixer (FIG. 2a)
cell V: bent-blade (FIG. 2c)

Arrangement of the openings:
between the cells I–III, II–III and III–IV: at a height of 0.12 m, in the upper part of the layer, width: 0.06 m, height: 0.04 m
between cells IV–V: in the bottom of the layer, width: 0.06 m, height: 0.03 m
between the cell V and the dispensing cell: in the upper part of the layer, at a height of 0.12 m; width: 0.06 m, as well as in the middle of the layer, at a height of 0.04 m, width: 0.03 m.

Into the cell I of the apparatus we introduce 3.57 kg/h active ingredient "A" of 30% water content. Through the perforated plate 45 m³/h air at 80° C. is introduced into this chamber. Chamber I serves for drying the wet active ingredient "A". The discharge air temperature is 40° C.

In cell II of the apparatus, ingredient "A" is after-dried and mixed with ingredient "B", lactose and starch. Into this chamber there is introduced 0.5 kg/h ingredient "B", 1.225 kg/h lactose and 0.6 kg/h starch. 35 m³/h air at 70° C. is introduced into the cell via the support, which air leaves the fluidization layer at about 40° C. The function of this cell is, in addition to the after-drying and mixing, to pre-heat the introduced material to about 40° C.

Cell III serves for achieving the introduction of the small-quantity ingredient "C" and of the pre-granulation with the ethyl cellulose binder. With the aid of the atomizer, 2.5 l/h chloroform as granulating liquid is introduced, the layer being kept in a fluidized state by means of 40 m³/h air at 60° C. The liquid contains per liter 30 g. of ethyl cellulose and 10 g. of active ingredient "C". The air leaves the cell III at a temperature of 35° C.

Cell IV of the granulating apparatus serves for wetting the mixture with a granulating liquid containing the binder and for completing the agglomeration. The layer is fluidized by 45 m³/h air at 70° C. and 1.25 l/h aqueous granulating liquid containing gelatin of a concentration of 60 g/l is atomized into the fluidized layer. The air leaving cell IV has a temperature of about 40° C.

In cell V the after-drying of the granules takes place. Through the cell support 30 m³/h air at 60° C. is introduced into the granulate layer. The air that leaves the layer has a temperature of 42° C. The particle size distribution of the tablet granulate, which is removed from this chamber at the rate of 5 kg/h, is as follows:

| | |
|---|---|
| under 0.2 mm | 12% |
| 0.2–0.4 mm | 19% |
| 0.4–0.6 mm | 26% |
| 0.6–1.0 mm | 25% |
| 1.0–2.0 mm | 17% |
| above 2.0 mm | 1% |
| | 100% |

The powder contents separated from the air discharged from the apparatus (cells I–V and the dispensing cell, respectively) is continuously fed back into cell II, thus ensuring uniformity of the composition.

EXAMPLE 3

The task is to produce a complex NPK fertilizer granulate which in addition to the three principal components, contains also trace elements, magnesium salts, soil sterilizers and weed killing materials; because of the special composition the product must be colored. The $N:P_2O_5:K_2O$ ingredient ratio is 1:1:1 and the following basic materials are available:

urea—N-content 46%
triple superphosphate—$P_2O_5$ content 49%
potassium salt—$K_2O$ content 60%

From the above basic materials—having regard to the fact that the specified quantity of the trace elements and the magnesium is 3% (2% of suspended MgO; 0.4% of $MnCl_2$; 0.3% of $ZnSO_4$; 0.2% of $CuSO_4$ and 0.1% of $CoCl_2$) and of the soil sterilizing and weed killing materials is 1% (0.2% of γ-hexachlorocyclohexane; 0.4% of 2-chloro-4 ethylamino-6 izopropylamino-s-triazine and 0.4% of 2-chloro-4,6-bis(ethylamino)-s-triazine) a complex fertilizer granulate can be produced in which the main ingredients are present in the approximate amount of $N:P_2O_5:K_2O=16:16:16\%$ (more accurately 16.3%).

The granulation is carried out in a five-cell continuously operating fluidization-granulation apparatus having a mechanical mixer. The cross-section of each individual cell is 0.0315 m² and the useful cross-section of the apparatus is 0.1575 m².

Mixer types:
Cell I: mixer of the horseshoe type (FIG. 2b)
Cell II: three-blade mixer (FIG. 2a)
Cell III: bent blade (FIG. 2c)
Cell IV: three-blader mixer (FIG. 2c)
Cell V: bent blade (FIG. 2c)

Arrangement of the openings:
between cells I–II: in the upper part of the layer, at a height of 0.12 m, width: 0.06 m, height: 0.04 m;
between cells II–III: at the bottom of the layer, width: 0.06 m, height: 0.03 m
between cells III–IV: in the upper part of the layer, at a height of 0.12 m, width: 0.06 m, height: 0.03 m, as well as the middle of the layer, at a height of 0.04 m, width: 0.06 m, height: 0.03 m
between cells IV–V: in the upper part of the layer, at a height of 0.12 m, width: 0.06 m, height: 0.04 m
between the cell V and the dispensing cell: in the middle part of the layer, at a height of 0.04 m, width: 0.06 m, height: 0.04 m.

Into the cell I of the apparatus 2.14 kg/h urea, 5.02 kg/h triple superphosphate and 4.08 kg/h potassium salt are introduced. The organic soil sterilizer and weed killer components in the form of a solution, as well as the trace elements and the magnesium salt are introduced into this cell. There are two atomizers in the cell. Through one of the atomizers 2 kg/h granulating liquid is atomized into the cell which contains 60% by weight urea and 22.5% by weight salts of magnesium, copper, manganese, zinc and cobalt. The fluidized state of the layer is maintained by streaming through it 70 m³/h air at 75° C. Through another atomizer 1 l/h organic material (soil sterilizer and weed killer) in an acetone solution of a concentration of 150 g/l is introduced into the fluidized layer. The temperature of the air leaving the layer is 40° C.

The larger portion of the urea binder is introduced into the particle heap in cell II such that 3.33 kg/h 60% by weight urea solution is atomized into the layer fluidized by 70 m³/h air at 80° C. Under the effect of wetting by the granulating liquid the particles are further agglomerated in the cell while a part of the water used as solvent leaves the layer. The discharged air has a temperature of 45° C.

Cell III serves for drying the granulates. Fluidized state of the layer is maintained by means of 70 m³/h air at 80° C. The air leaves the cell at 50° C.

In cell IV of the apparatus the coloring of the granulate is carried out. Into the granulate layer, maintained in a fluidized state by 60 m³/h air at 70° C., 2 l/h of a solution containing a colorant is atomized. The air leaves the cell at 45° C.

Cell V serves for the after-drying of the granulates. Into the chamber 55 m³/h air is introduced at 60° C., which leaves the layer at 45° C. From the cell V 15 kg/h complex fertilizer granulate is removed with the following size distribution:

| | |
|---|---|
| under 0.5 mm | 1% |
| 0.5–1.0 mm | 13% |
| 1.0–2.0 mm | 56% |
| 2.0–4.0 mm | 28% |
| >4.0 | 2% |
| | 100% |

The powder content separated from the air discharged from the apparatus (cells I–V) and the dispensing cell is continuously recycled into the cell II, so that the condition of the final product conforms to the planned composition.

The advantages of the apparatus according to the invention may be summarized as follows:

The multi-cell apparatus according to the invention, operating with fluidization and atomization, is suitable for the continuous production of granulates in a fluidization apparatus, the granulates lying within a narrow range of particle size, containing many components, including a plurality of small-quantity materials (which may be soluble in different solvents), wherein the granulates may be coated and colored. Compared with granulates made by conventional, continuous fluidization-granulation apparatuses, the granulate resulting from this invention is more compact, stronger and has better flow properties.

A further advantage of the apparatus is that—in contrast with conventional granulation in a fluidization and atomization apparatus—technological conditions can be provided to ensure that the most complex granulation task can be economically solved in a continuous operation in a single fluidization-granulation apparatus. A still further advantage is that in the appropriate chambers of the multicell fluidization-granulation apparatus the moisture content of the layer which is optimum for agglomeration and formation of coating can be ensured, as a consequence of which the physical properties of the granules formed are more favorable—smaller porosity, greater strength, better flow properties—than that produced in conventional, continuous granulation apparatus involving fluidization-atomization. The compactness of the granulates, their strength and flowability may be increased still further by using mechanical mixers of different types and different speeds of revolution in given chambers of the multi-cell apparatus. The possibilities of using mechanical mixing increase operational reliability as well as improve the qualities of the granulates. When performing coating, by the proper selection of the fluidization parameters and characteristics of mechanical mixing agglutination of the granules can be avoided.

Using multi-cell, continuously operating granulation apparatus according to the invention involving fluidization and atomization makes it possible to achieve—in dependence on the given granulation and coating task and its solution—optimum fluidization conditions for the particles in the different cells by using gases (preferably air) in different amounts and at different temperatures, as well as mechanical mixing elements of different types and speeds of revolution. It is always possible to introduce into the individual cells of the apparatus the optimum amount of gas at an optimum temperature, which considerably increases the economy and reliability of the process and makes it possible to produce granulates of temperature-sensitive materials (e.g. pharmaceuticals, foodstuffs, etc.).

As a further advantage of the granulating and coating apparatus it can be mentioned that, on the one hand, it is suitable in continuous operation for the introduction of components in very small quantities in uniform concentration, and on the other hand, in the same multicell, continuously operating fluidization-granulation apparatus the coating and coloring of the granules can be effected by atomizing solutions or suspensions of the coating and coloring materials in the appropriate space portions.

The continuous fluidization-granulation apparatus disclosed herein is equally suitable for solving granulation tasks in the pharmaceutical, foodstuffs, organic or inorganic chemical, and building (silicate) industries, as well as in other industries. In view of the task to be performed the technician is always able to select the apparatus units from which the apparatus may be assembled.

We claim:

1. A multi-cell fluidization and atomization apparatus for the continuous production of granules in a fluidized bed, comprising at least five cells communicating with each other in series, each of said cells being cylindrical and having a vertical axis, said cells comprising successively a preheating cell having a horseshoe agitator therein having upstanding terms, a first agglomerating cell having an asymmetric three-bladed agitator therein, a first drying cell having a bent blade agitator therein, a second agglomerating cell having an asymmetric three-bladed agitator therein, a second drying cell having a bent blade agitator therein, means in each of the cells for fluidizing particulate material independent from the fluidization in the other cells, means for spraying a liquid onto the fluidized material in said first and second agglomerating cells, and means common to all said agitators for rotating all said agitators in unison about spaced parallel vertical axes in their respective cells, the adjacent cells communicating with each other within the height range of said fluidized fed through openings in common side walls of said adjacent cells, the vertical position of each of said openings depending on the operations in said adjacent cells as well as on the vertical distribution of the particle size within said adjacent cells, said cells having a communicating air space with uniform pressure above said fluidized bed.

* * * * *